US010871389B2

(12) United States Patent
Paris et al.

(10) Patent No.: US 10,871,389 B2
(45) Date of Patent: Dec. 22, 2020

(54) VOLUMETRIC FLOW METER HAVING A CARTRIDGE CASING INSERTED IN A DUCT WITH INTERMESHED ROTORS

(71) Applicant: ELBI INTERNATIONAL S.p.A., Turin (IT)

(72) Inventors: Fabrizio Paris, Druento (IT); Massimo Davi, Bussoleno (IT); Maurizio Rendesi, Villarbasse (IT); Paolo Ravedati, Moncalieri (IT)

(73) Assignee: ELBI INTERNATIONAL S.p.A., Turin (IT)

( * ) Notice: Subject to any disclaimer, the term of this patent is extended or adjusted under 35 U.S.C. 154(b) by 0 days.

(21) Appl. No.: 16/460,556

(22) Filed: Jul. 2, 2019

(65) Prior Publication Data

US 2020/0011719 A1   Jan. 9, 2020

(30) Foreign Application Priority Data

Jul. 9, 2018   (IT) ........................ 102018000007022

(51) Int. Cl.
| | |
|---|---|
| G01F 1/10 | (2006.01) |
| G01F 3/10 | (2006.01) |
| G01F 1/075 | (2006.01) |
| G01F 25/00 | (2006.01) |

(52) U.S. Cl.
CPC ............... *G01F 3/10* (2013.01); *G01F 1/075* (2013.01); *G01F 1/10* (2013.01); *G01F 25/0007* (2013.01)

(58) Field of Classification Search
None
See application file for complete search history.

(56) References Cited

U.S. PATENT DOCUMENTS

| 1,233,599 | A | * | 7/1917 | Nuebling | F04C 18/16 418/201.1 |
|---|---|---|---|---|---|
| 2,368,019 | A | * | 1/1945 | Guibert | F04C 2/126 418/206.5 |
| 2,407,698 | A | * | 9/1946 | Guibert | G01F 3/10 418/205 |
| 2,572,334 | A | * | 10/1951 | Guibert | G01F 3/10 74/461 |
| 3,093,973 | A | * | 6/1963 | Williams | G01F 1/00 62/49.1 |

(Continued)

OTHER PUBLICATIONS

Italian Search Report for 201800007022 dated Feb. 27, 2019.

*Primary Examiner* — Harshad R Patel
(74) *Attorney, Agent, or Firm* — Sughrue Mion, PLLC

(57) ABSTRACT

A volumetric flow meter, including a casing (10) fitted into a duct (C; 51, 62, 63) and including a base body (11) and a cap (13) cooperating to define a housing chamber (15), the housing chamber (15) being on opposite sides delimited by a base plane (11*c*) formed in the base body (11) and by a cap plane (13*d*) formed in the cap (13). Through the cap (13) there is formed an inlet passage (13*e*) communicating with the housing chamber (15) and extending orthogonally to the base plane (11*c*). Through a bottom (11*d*) of the base body (11) there is an outlet passage (11*e*) communicating with the housing chamber (15) and extending orthogonally to the base plane (11*c*). The flow meter has rotors (17, 18) mounted rotatably within the housing chamber (15), a permanent magnet (19) arranged on board one of the rotors (17), and a magnetic sensor (20).

10 Claims, 7 Drawing Sheets

(56) References Cited

U.S. PATENT DOCUMENTS

| | | | | |
|---|---|---|---|---|
| 3,224,274 A * | 12/1965 | Silvern | G01F 3/10 | 73/261 |
| 3,245,258 A * | 4/1966 | Rystrom | G01F 3/10 | 73/261 |
| 3,288,197 A * | 11/1966 | Rose | G01F 3/10 | 431/89 |
| 3,304,781 A * | 2/1967 | Stevenson | G01F 3/10 | 73/253 |
| 3,342,071 A * | 9/1967 | Meyers | G01F 3/10 | 73/261 |
| 3,748,903 A * | 7/1973 | Irie | G01F 3/10 | 73/261 |
| 3,822,591 A * | 7/1974 | Li | G01F 3/14 | 73/861.81 |
| 4,248,099 A * | 2/1981 | Allen, Jr. | G01F 1/82 | 73/861.353 |
| 4,641,522 A * | 2/1987 | Lopresti | G01F 3/10 | 73/261 |
| 4,911,010 A * | 3/1990 | Foran, Jr. | G01F 3/10 | 73/261 |
| 5,704,767 A * | 1/1998 | Johnson | F04C 11/00 | 417/43 |
| 5,895,847 A * | 4/1999 | Steuer | G01D 5/2013 | 417/418 |
| 6,250,151 B1 * | 6/2001 | Tingleff | G01F 3/10 | 73/253 |
| 2004/0250617 A1 | 12/2004 | Klassen | | |
| 2007/0090296 A1 | 4/2007 | Hoyt et al. | | |
| 2008/0202255 A1 * | 8/2008 | Albrecht | G01F 15/066 | 73/861.08 |
| 2009/0314115 A1 * | 12/2009 | Breeser | G01F 3/10 | 74/457 |
| 2010/0005903 A1 * | 1/2010 | Beavis | G01F 1/56 | 73/861.47 |
| 2010/0199758 A1 * | 8/2010 | Tokhtuev | G01F 3/10 | 73/261 |
| 2012/0031195 A1 * | 2/2012 | Skirda | G01F 3/10 | 73/861.08 |
| 2014/0260672 A1 * | 9/2014 | Tokhtuev | G01F 1/06 | 73/861.77 |
| 2016/0258790 A1 * | 9/2016 | Tokhtuev | G01F 1/065 | |
| 2020/0088554 A1 * | 3/2020 | Vromans | G01F 25/0007 | |

* cited by examiner

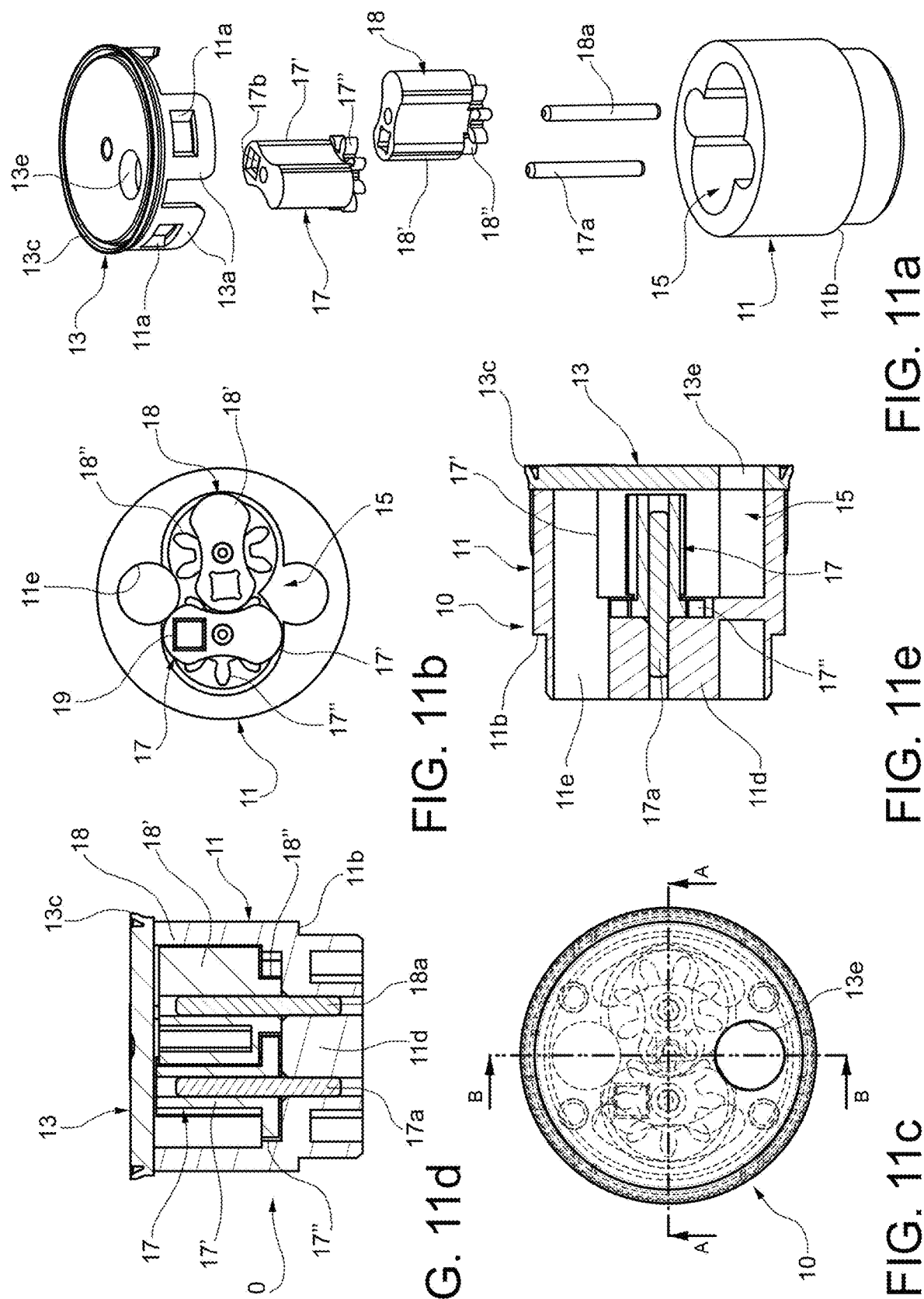

VOLUMETRIC FLOW METER HAVING A CARTRIDGE CASING INSERTED IN A DUCT WITH INTERMESHED ROTORS

BACKGROUND OF THE INVENTION

The present invention concerns a volumetric flow meter.

In particular, the present invention concerns a volumetric flow meter including a casing adapted to be fitted into a duct and comprising a base body and a cap cooperating to define a housing chamber, said housing chamber being on opposite sides delimited by a base plane formed in the base body and by a cap plane formed in the cap, wherein through the cap there is formed an inlet passage fluidically communicating with the housing chamber and extending orthogonally to the base plane, and wherein through a bottom of the base body there is formed an outlet passage fluidically communicating with the housing chamber and extending orthogonally to the base plane, a pair of rotors mounted rotatable within the housing chamber about respective rotation axes orthogonal to the base plane, at least one permanent magnet arranged on board one of the rotors, and a magnetic sensor capable of providing pulses deriving from a passage in the field of action of the permanent magnet (detecting in particular a rotational motion), wherein a liquid flow entering the inlet passage and exiting the outlet passage is able to cause the rotors to rotate within the housing chamber, and wherein the magnetic sensor is able to provide an electrical signal indicating the volumetric flow rate of the liquid flow, in particular by means of a correlation table between the pulses supplied by the sensor and the flow rate stored in a control unit (not shown).

The rotors may be coupled to each other and/or have different configurations, such as, for example, elliptical sprockets or lobe rotors with integrated sprockets to drive the same lobes. The coupling between the rotors guarantees the synchronism thereof.

The invention further has as its object a fluidic component comprising a duct adapted to be traveled by a liquid flow along a main flow direction, wherein is inserted a volumetric flow meter according to the invention, wherein the inlet passage (i.e. the axis of the inlet passage) and the outlet passage (i.e. the axis of the outlet passage) of the volumetric flow meter are arranged parallel to a direction of extension of the duct, whereby the liquid flow is able to pass through the inlet passage and the outlet passage respectively, along a direction parallel and concordant with the main direction of flow in the duct.

For the purpose of the present invention, "fluidic component" means any component which may be used in a system or circuit for the transport of a liquid, such as a pipe, a valve, a loading device, a mixing device, and so on. According to a specific example of embodiment, this may be an independent flow meter group and adapted to be connected to a system or circuit for the transport of liquid.

Preferred embodiments of the invention are the object of the dependent claims, which are intended as an integral part of the present description.

SUMMARY OF THE INVENTION

Features and advantages of the invention will become apparent from the detailed description that follows, provided purely by way of non-limiting example with reference to the accompanying drawings, wherein.

Figure 10:
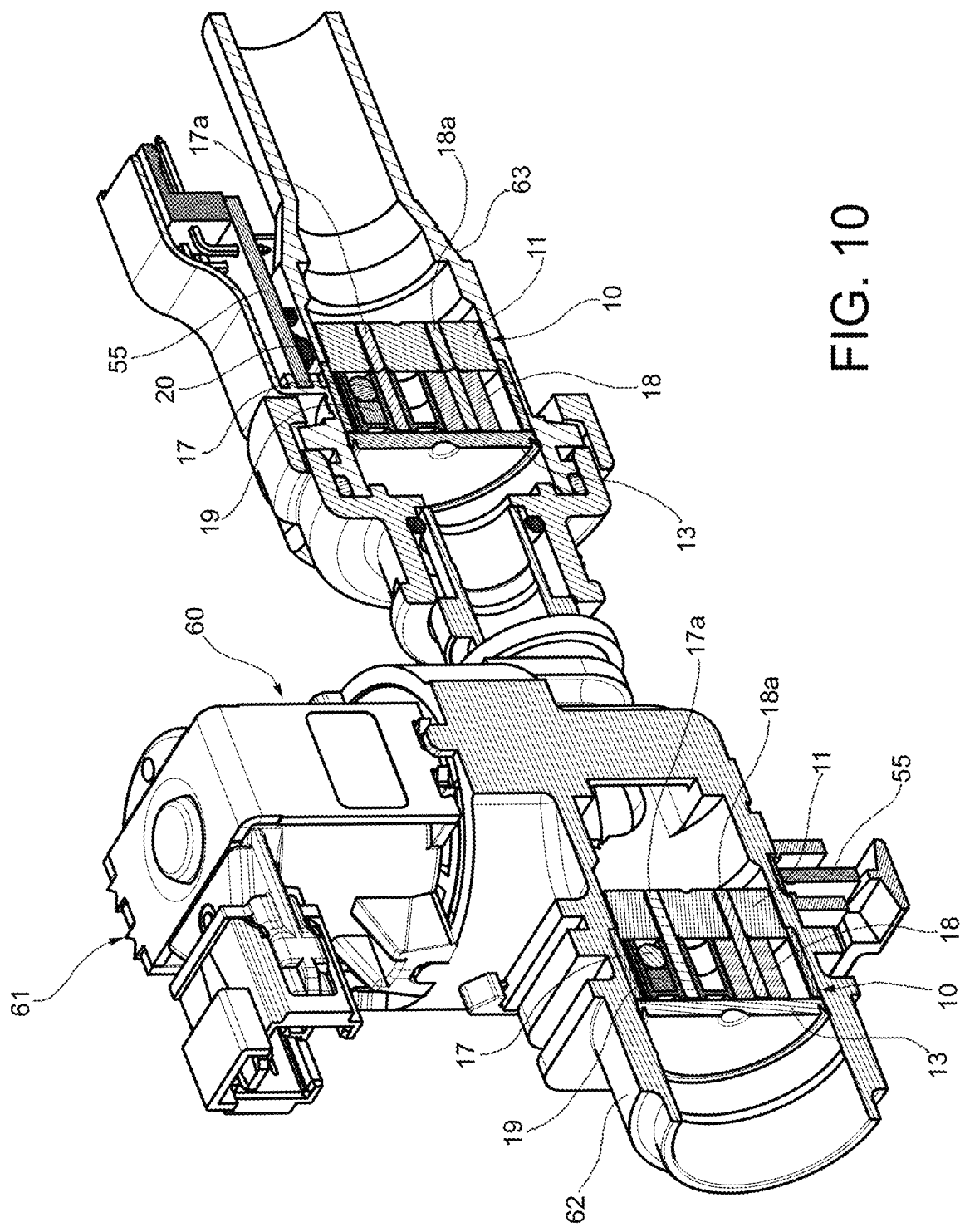

FIG. 10 is a cutaway perspective view of a solenoid device to which a flow meter is associated according to the invention; and FIGS. 11a-11e are respectively: an exploded view of an alternative embodiment of a flow meter according to the invention, a plan view of a base body with rotors of the flow meter of FIG. 11a, a plan view of the flow meter of 11a, and sectional views taken respectively along the lines A-A and B-B of FIG. 11c.

DETAILED DESCRIPTION OF THE INVENTION

With reference to FIGS. 1 to 5, a volumetric flow meter according to the invention is illustrated. Such a flow meter is essentially a cartridge that may be inserted into a duct, and a sensor (shown in FIG. 4) that may be placed on board the cartridge, or on board the duct.

The flow meter comprises a casing 10, i.e. the casing of the cartridge, which is suitable for insertion into a duct C. The casing 10 consists of a base body 11 and a cap 13 that cooperate to define a housing chamber 15. Preferably, the base body 11 and the cap 13 are formed as one-piece bodies, for example, of plastic material.

Due to the fact that the flow meter is placed inside a duct, there is no need for gaskets between the cap and the body containing the gears.

The cap 13 is fitted to the base body 11, for example, snap-fitted. In the example shown, on the peripheral edge of the cap 13 facing the base body 11, there is provided a plurality of elastic tabs 13a with respective windows 13b, which are adapted to snap together with teeth or protrusions 11a formed on an outer surface of the base body 11.

On a peripheral edge of the cap 13, facing away from the base body 11, there is obtained a sealing lip 13c extending radially and axially outwards. The sealing lip 13c is adapted to engage an inner surface of the duct C, so as to prevent the liquid from drawing between the inner surface of the duct C and the outer surface of the cartridge of the flow meter.

On the base body 11 there is a shoulder surface 11b adapted to engage a corresponding seat formed on the inner surface of the duct. This ensures that the flow meter is correctly positioned within the duct and further prevents the flow meter from moving during use.

The housing chamber 15 is on opposite sides delimited by a base plane 11c formed in the base body 11 and by a cap plane 13d formed in the cap 13 and parallel to the base plane 11c. Through the cap 13 an entrance passage 13e is formed, fluidically communicating with the housing chamber 15 and extending orthogonally to the base plane 11c. Through a bottom 11d of the base body 11 an outlet passage 11e is formed, fluidically communicating with the housing chamber 15 and extending orthogonally to the base plane 11c. The axes of the inlet passage 13e and the outlet passage 11e are parallel to each other and do not coincide. In the cross section (see, for example, FIGS. 3 and 5), the housing chamber 15 has a quadrilobate shape, and thus comprises two opposing primary lobes 15a and 15b, and two opposing secondary lobes 15c and 15d and arranged orthogonally to the primary lobes 15a, 15b. The inlet passage 13e and the outlet passage 11e are respectively connected to the secondary lobes 15c and 15d of the housing chamber 15.

The flow meter further comprises a pair of elliptical sprockets 17 and 18 rotatably mounted within the housing chamber 15 about respective rotation axes $x_A$ and $x_B$ orthogonal to the base plane 11c. The elliptical sprockets 17 and 18 are coupled to each other by means of the respective teeth. Each of the sprockets 17 and 18 is mounted rotatably on a pin, respectively 17a and 18a, which is inserted into a respective hole obtained through the bottom 11d of the base body 11. Naturally, other configurations are possible which are able to ensure the possibility of rotation of the sprockets 17 and 18.

The elliptical sprockets 17 and 18 are respectively housed in the primary lobes 15a and 15b of the housing chamber 15. The primary lobes 15a and 15b are thus arranged along an axis that interconnects the rotation axes of the sprockets.

A permanent magnet 19 is placed on board one of the elliptical sprockets; in the example shown, the sprocket 17, in an eccentric position with respect to the rotation axis $x_A$. For this purpose, a cavity 17b is made in the sprocket 17 provided to accommodate the permanent magnet 19, which is closed by a deformable closing element 17c (visible, for example, in FIG. 7). Naturally, other configurations are possible which are able to provide the sprocket 17 with a permanent magnet. Moreover, it is also possible to arrange two permanent magnets on the sprocket in diametrically opposed positions.

Figure 1:
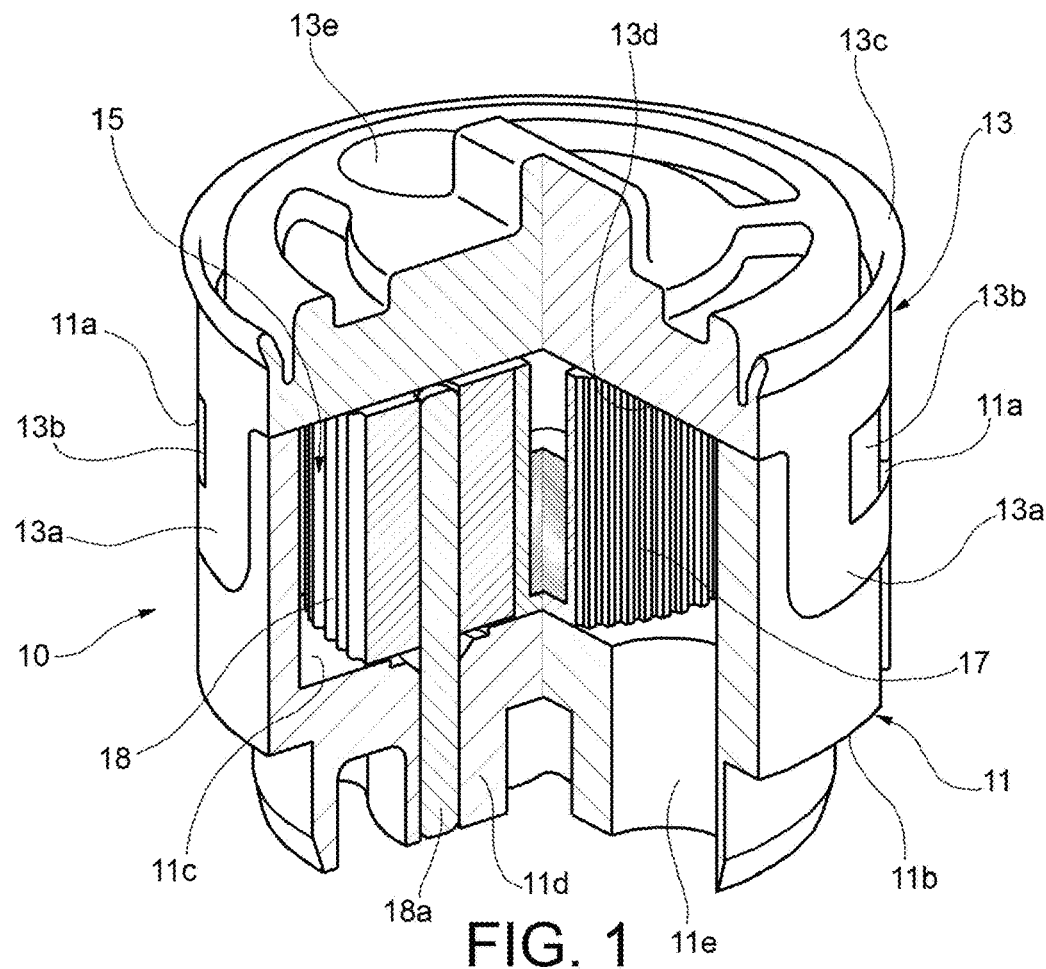
FIG. 1 is a cutaway perspective view of a volumetric flow meter according to the invention.
Figure 2:
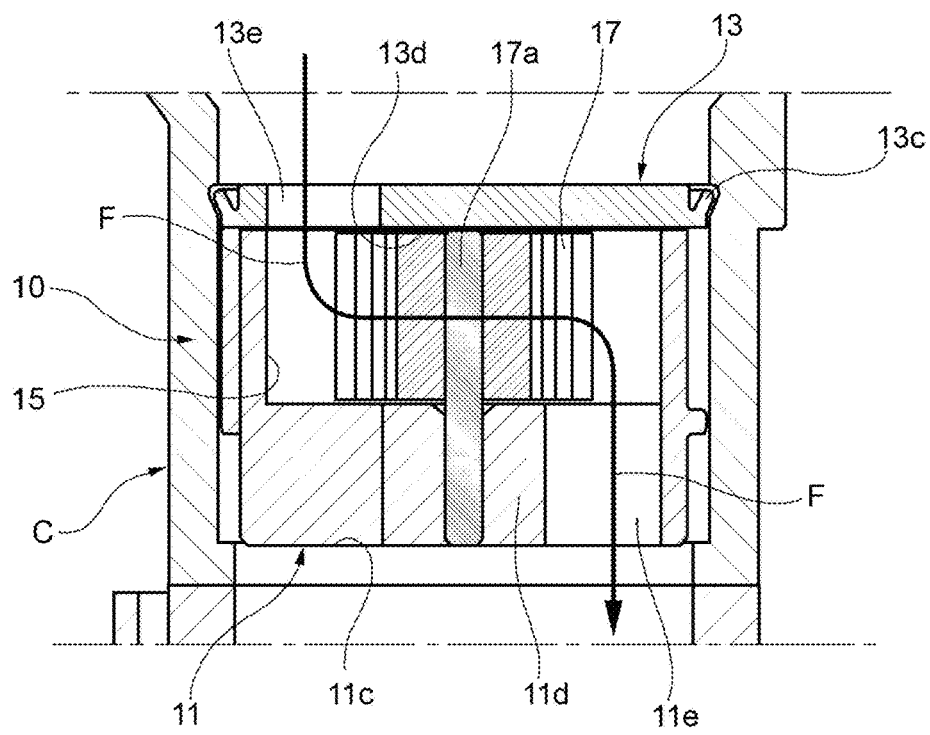
FIG. 2 is a cross-sectional view of the flow meter of FIG. 1 inserted in a duct.
Figure 3:
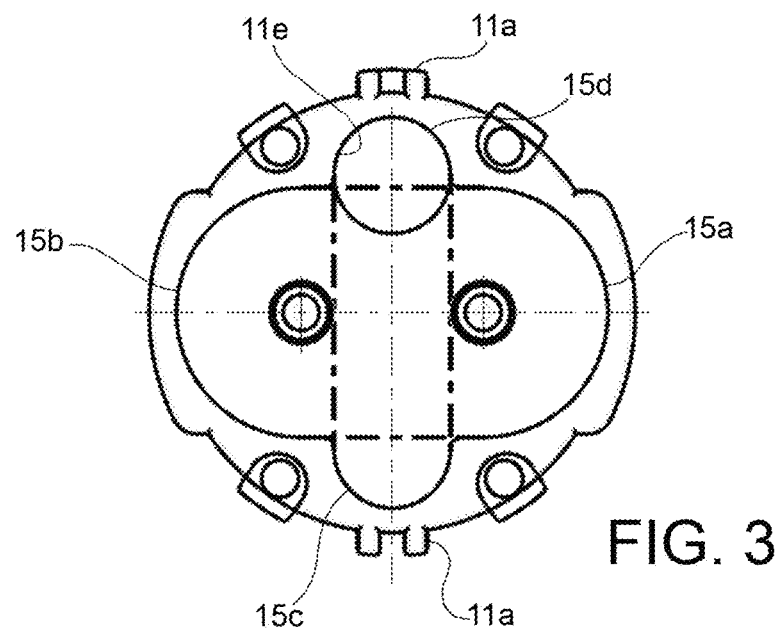
FIG. 3 is a plan view of a base body of the flow meter in FIG. 1.
Figure 4:
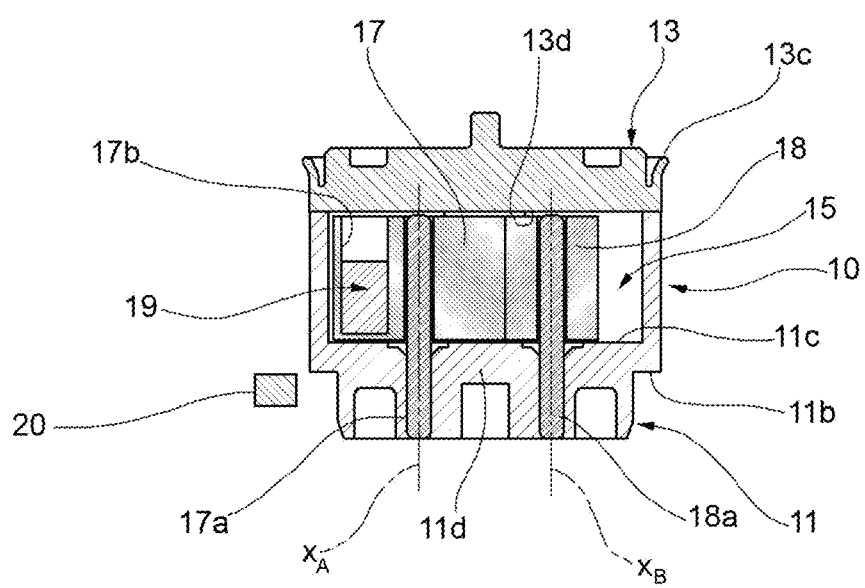
FIG. 4 is a cross-sectional view of the flow meter in FIG. 1, taken orthogonally to the view in FIG. 2.
Figure 5:
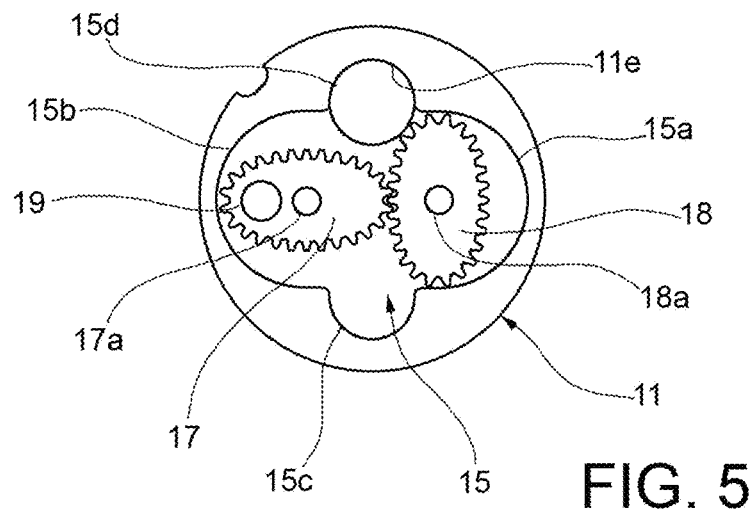
FIG. 5 is a plan view showing the components within a housing chamber of the flow meter in 1.
Figure 6:
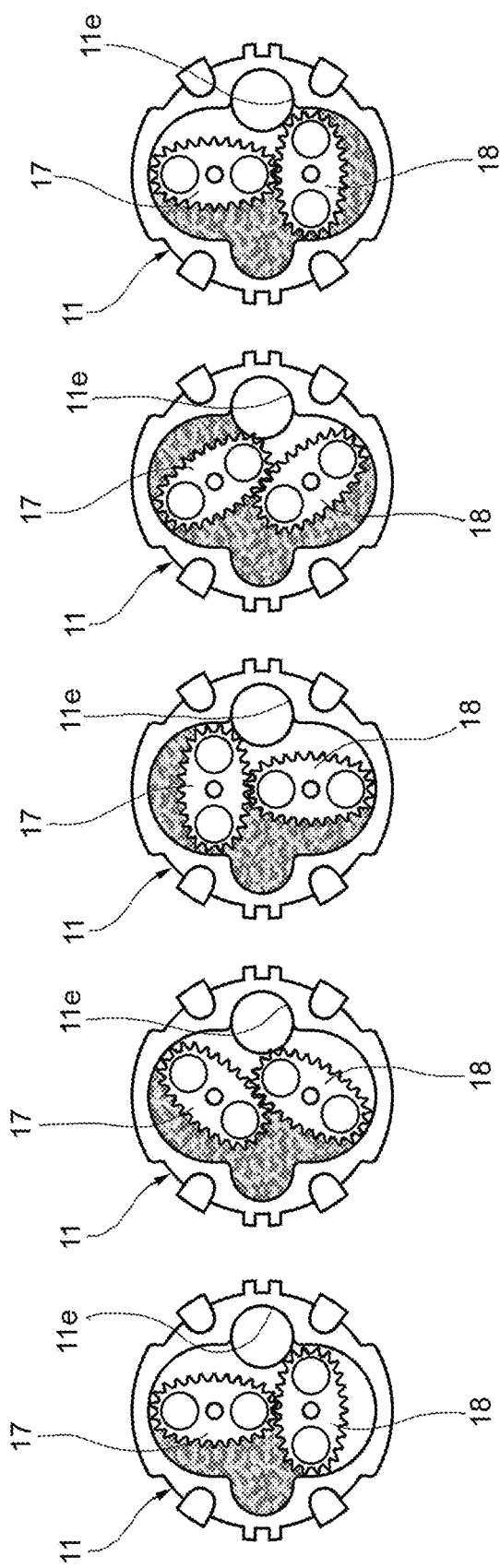
FIGS. 6a-6e are plan views illustrating the operation of the flow meter in FIG. 1.

FIG. 4 also shows schematically a magnetic sensor 20 arranged laterally and adapted to detect a rotational motion of the permanent magnet 19, for example, a Hall sensor.

With reference to FIGS. 2 and 6a-6e, a liquid flow (indicated by the arrows F in FIG. 2) entering from the inlet passage 13e and leaving from the outlet passage 11e is able to cause a rotation of the elliptical sprockets 17 and 18 in the housing chamber 15. As may be seen in the figures, the housing chamber 15 is shaped so as to inscribe the profile of the gear rotation and the profiles of the two inlet and outlet passages. In FIG. 6a-6e the area drawn in a darker color in the housing chamber 15 represents the subsequent steps in the movement of the liquid within the housing chamber 15. Overall, the liquid flow has a path deducible from the arrows F of FIG. 2, i.e., a direction parallel and equal to the main flow of fluid inside the duct in the steps of entry and exit from the flow meter; inside the flow meter, the flow of fluid is directed substantially perpendicular to the rotation axes of the sprockets. However, the characteristic aspect is that of having created a flow meter which, at the inlet and outlet, sees a fluid flowing on parallel axes and with equal directions. In other words, the outlet direction of the fluid is equal to the inlet direction of the same fluid. This is an advantage when inserting the flow meter into fluid-carrying ducts and allows for a compact construction. The rotation of the sprockets 17 and 18 means that the permanent magnet 19, joined to one of the sprockets, also completes a rotational motion, according to a law known per se which depends on the volumetric flow rate of the liquid flow.

The magnetic sensor 20 detecting the rotational motion of the magnet 18 is, however, able to provide an electric signal indicative of the volumetric flow rate of the liquid flow.

The specific inlet and outlet direction of the liquid allows the rotating part to be hit by the fluid according to a uniform pressure on the elliptical surface of the gear, thus limiting friction and wear of the pin+rotor group and allowing the use of gears with different masses. In effect, there is no dynamic component that directly hits the gear.

Figure 7:
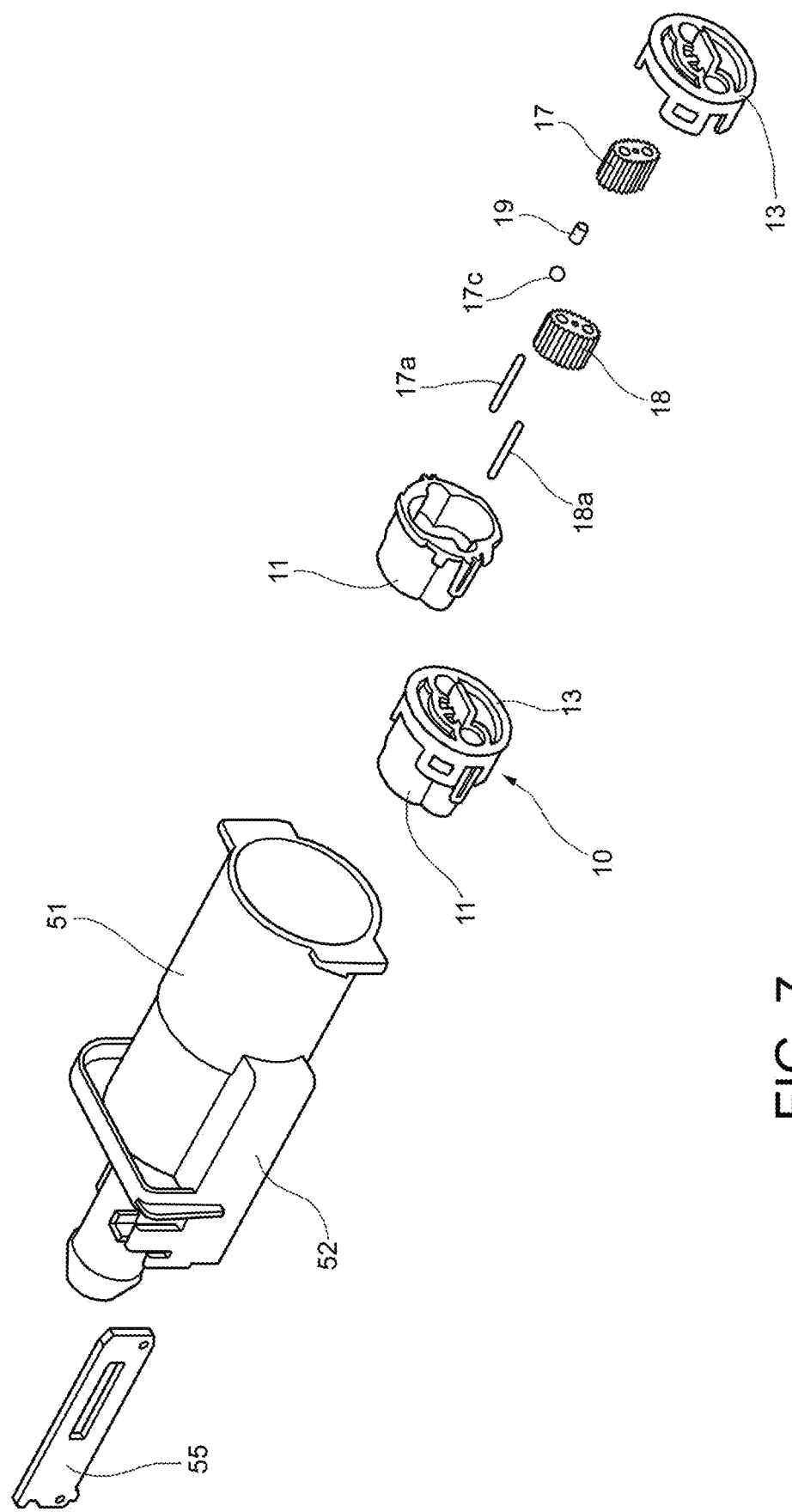
FIG. 7 is an exploded view of a flow meter group.
Figure 8:
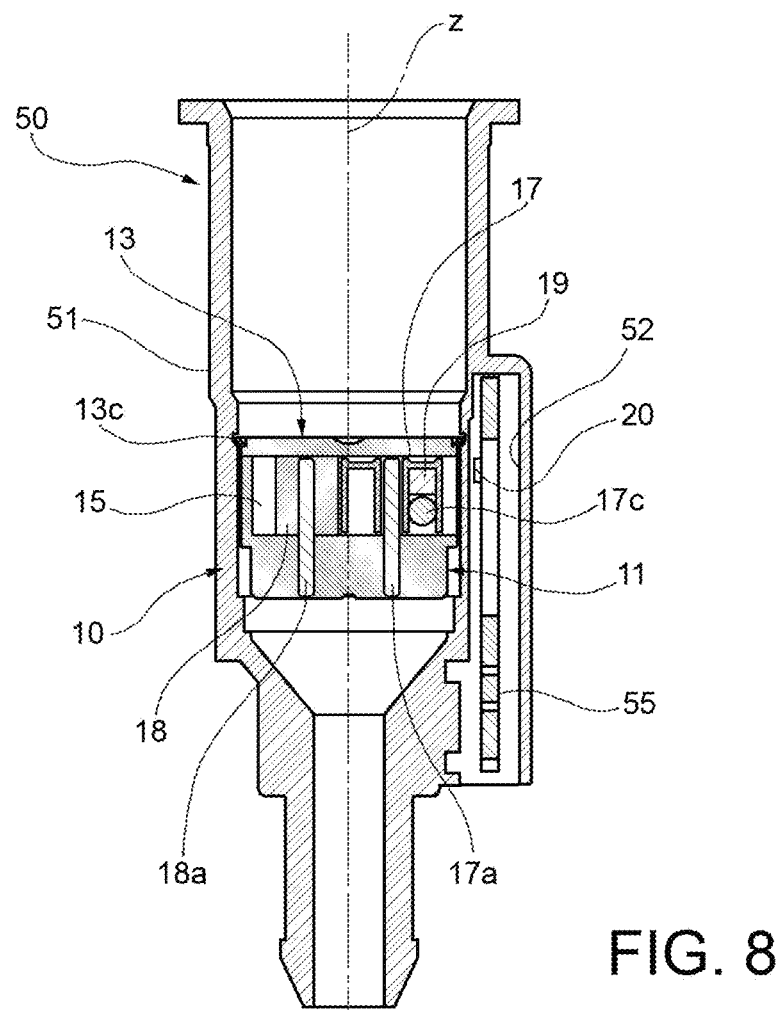
FIG. 8 is a longitudinal sectional view of the flow meter group as shown in FIG. 7.
Figure 9:
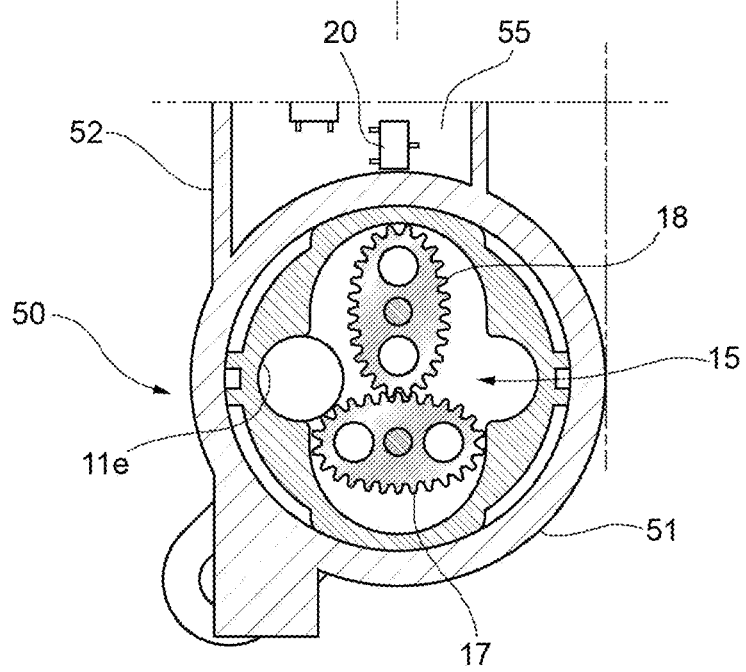
FIG. 9 is a cross-sectional view of the flow meter group of FIG. 7.

FIGS. 7-9 show a flow meter group, which may be associated with a liquid transport system or circuit (not shown). The flow meter group 50 essentially comprises a duct 51 provided with opposite ends configured to be coupled to respective components of the liquid transport system or circuit not illustrated. Within the duct 51 is inserted a flow meter cartridge of the type described above. On a wall of the duct 51, at the height of the seat wherein the cartridge of the flow meter is arranged, there is a housing 52 adapted to receive a printed circuit board 55 on which the magnetic sensor is arranged. The board 55 is configured to be connected to an outer unit (not shown) to power the sensor and to receive the signal provided by the sensor.

The inlet passage 13e and the outlet passage 11e of the volumetric flow meter are arranged parallel to the extension direction z of the duct 51 (which naturally corresponds to the main flow direction of the liquid in the duct). The liquid flow is thus able to pass through the inlet passage 13e and the outlet passage 11e, respectively, along a direction parallel and concordant with the main flow direction in the duct.

By way of example of a possible application of the invention, FIG. 10 shows a valve group 60 known per se, equipped with a solenoid valve 61. In the valve group 60 there are two ducts 62 and 63. Within each of the two ducts 62, 63 is inserted a respective flow meter cartridge of the type described above, to which is joined a respective printed circuit board 55 that supports a magnetic sensor 20, in a manner similar to that described in reference to FIGS. 7-9.

In reference to FIGS. 11a-11e, an alternative embodiment of a flow meter according to the invention is illustrated. Elements corresponding to those of the previous embodiments have been designated with the same numerical references; such elements will not be further described. The embodiment of FIGS. 11a-11e differs from that of FIGS. 1-10 essentially by the shape of the rotors 17 and 18. Each rotor 17, 18 comprises in effect a first rotor part 17' and 18' respectively, having a bilobate cross section, and a second rotor part 17" and 18" respectively, in the form of a sprocket. The rotors 17 and 18 are coupled to each other by the respective second rotor parts 17", 18". The first parts of the rotor 17' and 18' are, on the other hand, arranged in such a way as to intercept the liquid flow in the flow meter, and then be pulled along by that flow, without there being mutual interference.

Naturally, without altering the principle of the invention, the embodiments and the details of construction may vary widely with respect to those described and illustrated purely by way of non-limiting example, without thereby departing from the scope of the invention as defined in the accompanying claims.

What is claimed is:
1. A volumetric flow meter comprising
   a casing adapted to be fitted into a cylindrical duct and comprising a base body and a cap cooperating to define a housing chamber, said housing chamber being on opposite sides delimited by a base plane formed in the base body and by a cap plane formed in the cap, wherein through the cap there is formed an inlet passage fluidically communicating with the housing chamber and extending orthogonally to the base plane, and wherein through a bottom of the base body there is formed an outlet passage fluidically communicating with the housing chamber and extending orthogonally to the base plane, wherein the cap is snap-fitted to the base body and wherein the casing is without a gasket between the base body and the cap, a pair of rotors rotatably mounted within the housing chamber, about respective rotation axes orthogonal to the base plane, at least one permanent magnet arranged on board of one of the rotors, and a magnetic sensor adapted to detect a rotational motion of the permanent magnet, wherein a liquid flow entering the inlet passage and exiting the outlet passage is able to cause the rotors to rotate within the housing chamber, and wherein the magnetic sensor is able to provide an electric signal indicative of the volumetric flow rate of the liquid flow, wherein the volumetric flow meter is configured to be placed entirely inside the duct, and wherein, on a periphery of the casing, there is formed a sealing lip extending radially and axially outwards and adapted to engage an inner surface of the duct.

2. The volumetric flow meter according to claim 1, wherein the rotors are coupled to each other.

3. The volumetric flow meter according to claim 1, wherein the inlet passage and the outlet passage are arranged staggered relative to a central axis of the casing.

4. The volumetric flow meter according to claim 1, wherein the magnetic sensor is mounted to the base body.

5. The volumetric flow meter according to claim 1, wherein the magnetic sensor is adapted to be mounted to the duct.

6. The volumetric flow meter according to claim 1, wherein the housing chamber has a quadrilobate cross-sectional shape, and comprises two opposed primary lobes, in which the rotors are respectively housed, and two opposed secondary lobes, arranged orthogonally to the primary lobes, to which the inlet passage and the outlet passage are respectively connected.

7. The volumetric flow meter according to claim 1, wherein on the base body there is formed a shoulder surface adapted to engage a corresponding seat formed on an inner surface of the duct.

8. The volumetric flow meter according to claim 1, wherein the duct comprises an inner surface, and the casing of the volumetric flow meter is configured to be entirely enclosed within the inner surface of the duct.

9. A fluidic component comprising a cylindrical duct adapted to be traveled by a liquid flow along a main flow direction, in which there is fitted a volumetric flow meter, said volumetric flow meter comprising a casing comprising a base body and a cap cooperating to define a housing chamber, said housing chamber being on opposite sides delimited by a base plane formed in the base body and by a cap plane formed in the cap, wherein through the cap there is formed an inlet passage fluidically communicating with the housing chamber and extending orthogonally to the base plane, and wherein through a bottom of the base body there is formed an outlet passage fluidically communicating with the housing chamber and extending orthogonally to the base plane, wherein the cap is snap-fitted to the base body and wherein the casing is without a gasket between the base body and the cap, a pair of rotors rotatably mounted within the housing chamber, about respective rotation axes orthogonal to the base plane, at least one permanent magnet arranged on board of one of the rotors, and a magnetic sensor adapted to detect a rotational motion of the permanent magnet, wherein a liquid flow entering the inlet passage and exiting the outlet passage is able to cause the rotors to rotate within the housing chamber, wherein the magnetic sensor is able to provide an electric signal indicative of the volumetric flow rate of the liquid flow, wherein the volumetric flow meter is placed entirely inside the duct, and wherein, on a periphery of the casing, there is formed a sealing lip extending radially and axially outwards and engaging an inner surface of the duct, wherein the inlet passage and the outlet passage of the volumetric flow meter are arranged parallel to an extension direction of the duct, in such a way that the liquid flow is able to pass through the inlet passage and, respectively, the outlet passage along a direction parallel and concordant with the main flow direction in the duct.

10. The fluidic component according to claim 9, wherein the duct comprises an inner surface, and the casing of the volumetric flow meter is entirely enclosed within the inner surface of the duct.

* * * * *